United States Patent
Lin et al.

(10) Patent No.: US 7,894,539 B2
(45) Date of Patent: Feb. 22, 2011

(54) METHOD AND DEVICE FOR ESTIMATING INTEGER CARRIER FREQUENCY OFFSET

(75) Inventors: Huei-Jin Lin, Taichung (TW); Wei Ping Chuang, Kaohsiung (TW); Jiun-Yo Lai, Taichung (TW); Pang-An Ting, Taichung County (TW)

(73) Assignee: Industrial Technology Research Institute, Hsinchu (TW)

( * ) Notice: Subject to any disclaimer, the term of this patent is extended or adjusted under 35 U.S.C. 154(b) by 929 days.

(21) Appl. No.: 11/808,207

(22) Filed: Jun. 7, 2007

(65) Prior Publication Data

US 2008/0260085 A1 Oct. 23, 2008

(51) Int. Cl.
*H04L 7/04* (2006.01)
(52) U.S. Cl. .................... 375/260; 375/340; 370/203
(58) Field of Classification Search ............... 375/149, 375/343, 260, 340, 147; 370/345, 331, 208, 370/350, 203
See application file for complete search history.

(56) References Cited

U.S. PATENT DOCUMENTS

| | | | |
|---|---|---|---|
| 6,807,241 B1 | 10/2004 | Milbar et al. | |
| 2003/0227978 A1* | 12/2003 | Magee et al. | 375/260 |
| 2004/0141457 A1* | 7/2004 | Seo et al. | 370/203 |
| 2006/0062196 A1* | 3/2006 | Cai et al. | 370/345 |
| 2006/0133321 A1* | 6/2006 | Lim et al. | 370/331 |
| 2007/0140323 A1* | 6/2007 | Patel et al. | 375/149 |
| 2007/0217534 A1* | 9/2007 | Lee et al. | 375/260 |
| 2007/0217552 A1* | 9/2007 | Lee et al. | 375/343 |
| 2007/0230590 A1* | 10/2007 | Choi et al. | 375/260 |
| 2007/0280098 A1* | 12/2007 | Bhatt et al. | 370/208 |

* cited by examiner

*Primary Examiner*—Chieh M Fan
*Assistant Examiner*—Aristocratis Fotakis
(74) *Attorney, Agent, or Firm*—Birch, Stewart, Kolasch & Birch, LLP (57) ABSTRACT

The method disclosed in the invention comprises setting a plurality of subcarrier position hypotheses for a received preamble according to a plurality of ideal subcarrier positions and the maximum amount of integer carrier frequency offset (ICFO), generating a plurality of preamble pattern hypotheses by retrieving the received preamble according to the subcarrier position hypotheses, calculating the correlation between the preamble pattern hypotheses and a plurality of specified preamble patterns, determining to which sector the received preamble belongs according to a correct preamble pattern, the specified preamble pattern having the highest correlation with the preamble pattern hypotheses, obtaining a correct subcarrier position according to the sector to which the received preamble belongs; and estimating the ICFO by calculating the offset between the correct subcarrier position and the subcarrier position hypothesis of the preamble pattern hypothesis having the highest correlation with the correct preamble pattern.

18 Claims, 7 Drawing Sheets

METHOD AND DEVICE FOR ESTIMATING INTEGER CARRIER FREQUENCY OFFSET

BACKGROUND OF THE INVENTION

1. Field of the Invention

The invention relates to methods and devices for estimating integer carrier frequency offset between transmitter and receiver.

2. Description of the Related Art

Figure 1:
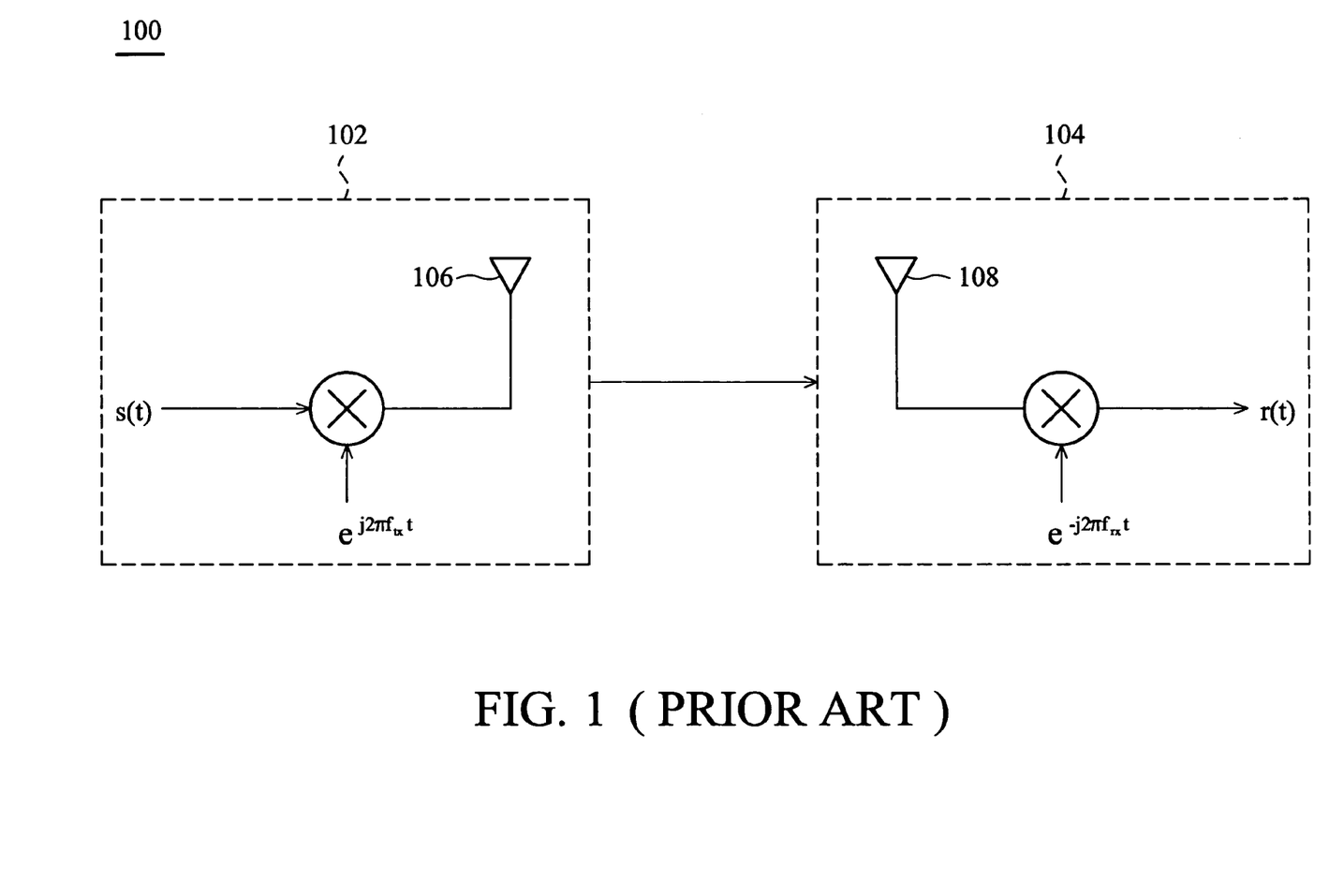
FIG. 1 illustrates a wireless communication system.

FIG. 1 illustrates a wireless communication system 100, comprising a transmitter 102 and a receiver 104. In the transmitter 102, a signal s(t) is mixed with a signal $e^{j2\pi f_{tx}t}$ and is then broadcast by an antenna 106. The emitted broadcast signal is received by an antenna 108 of the receiver 104. In the receiver 104, the signal received by the antenna 108 is mixed with a signal of $e^{-j2\pi f_{rx}t}$ to generate a received signal r(t), wherein $r(t) = s(t) \cdot e^{j2\pi f_{tx}t} \cdot e^{-j2\pi f_{rx}t} = s(t) \cdot e^{j2\pi(f_{tx}-f_{rx})t} = s(t) \cdot e^{j2\pi f_\Delta t}$, where $f_\Delta$ represents carrier frequency offset between the transmitter 102 and the receiver 104. After normalizing the carrier frequency $f_\Delta$ to the subcarrier spacing of the system, the carrier frequency offset $f_\Delta$ is divided into integral portion $f_{int}$ and fractional portion $f_{frac}$, wherein $f_\Delta = f_{int} + f_{frac}$. The integer portion $f_{int}$ is an Integer Carrier Frequency Offset (ICFO).

In conventional techniques, such as that disclosed in U.S. Pat. No. 6,807,241, seven frames of received signal are required to estimate the integer portion $f_{int}$, a time consuming method. In another conventional technique, as disclosed in U.S. Pat. No. 6,058,101, a large number of Inverse Fast Fourier Transform (IFFT) devices are required to transform signals into time domain, which complicates the operation considerably.

Methods and devices for estimating the ICFO that address such shortcomings are thus called for.

BRIEF SUMMARY OF THE INVENTION

Methods and devices for estimating integer carrier frequency offset between the transmitter and receiver are disclosed in the invention. In the invention, the value of ICFO is estimated by analyzing the preamble contained in one frame of the received signal, with no Inverse Fast Fourier Transform (IFFT) devices required since signals are processed in frequency domain.

An embodiment of the method comprises setting a plurality of subcarrier position hypotheses for a received preamble according to a plurality of ideal subcarrier positions and the maximum amount of ICFO between the transmitter and receiver, generating a plurality of preamble pattern hypotheses by retrieving the received preamble according to the subcarrier position hypotheses, calculating the correlation between the preamble pattern hypotheses and a plurality of specified preamble patterns, determining to which sector the received preamble belongs according to a correct preamble pattern that is the specified preamble pattern having the highest correlation with the preamble pattern hypotheses, obtaining a correct subcarrier position according to the sector to which the received preamble belongs, and estimating the value of ICFO by calculating the offset between the correct subcarrier position and the subcarrier position hypothesis corresponding to the preamble pattern hypothesis having the highest correlation with the correct preamble pattern.

The invention further discloses integer carrier frequency offset estimators utilizing the disclosed method.

The above and other advantages will become more apparent with reference to the following description taken in conjunction with the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
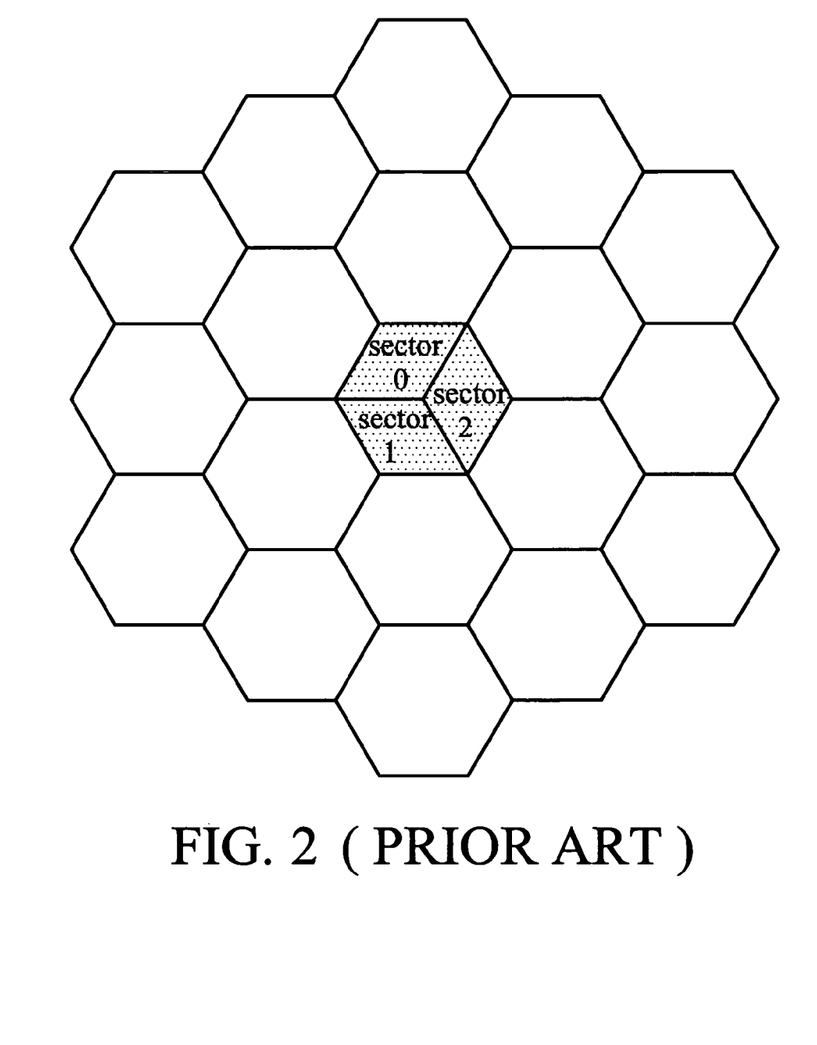
FIG. 2 shows the cell structure of a WiMAX system.
Figure 3:
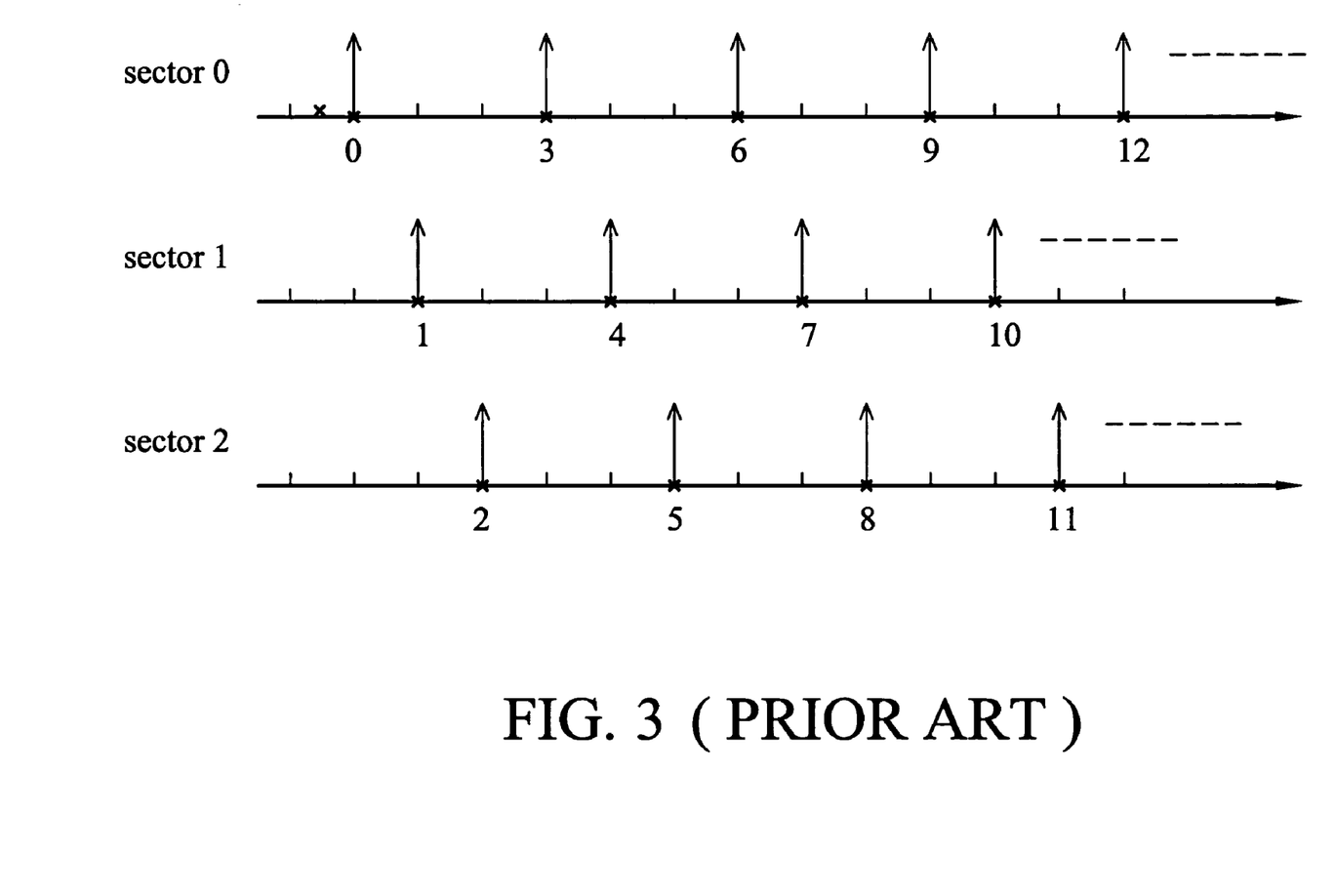
FIG. 3 illustrates ideal subcarrier positions of preambles of different sectors.

In an embodiment of the invention, the disclosed technique is applied in Orthogonal Frequency Division Multiplexing (OFDM) related systems including Orthogonal Frequency Division Multiple Access (OFDMA) systems, such as Worldwide Interoperability for Microwave Access (WiMAX). FIG. 2 shows the cell structure of a WiMAX system. Each cell is divided into sectors 0, 1, and 2. Signals transmitted in different sectors have different preamble patterns. In frequency domain, the preamble signals belonging to different sectors are in different subcarrier positions. FIG. 3 illustrates the ideal subcarrier positions of preambles of different sectors. For sector n, the preamble is allocated in n+3k subcarriers, where k is an integer from 0 to q, and q is dependent on the size of Fast Fourier Transform (FFT) used in the system. The number of subcarriers used in transmitting the preamble is q+1. As shown in FIG. 3, for sector 0, the preamble is allocated at subcarrier spacing indices 0, 3 . . . (0+3k) . . . (0+3q). For sector 1, the preamble is allocated at indices 1, 4 . . . (1+3k) . . . (1+3q). For sector 2, the preamble is allocated at indices 2, 5 . . . (2+3k) . . . (2+3q).

Figure 4:
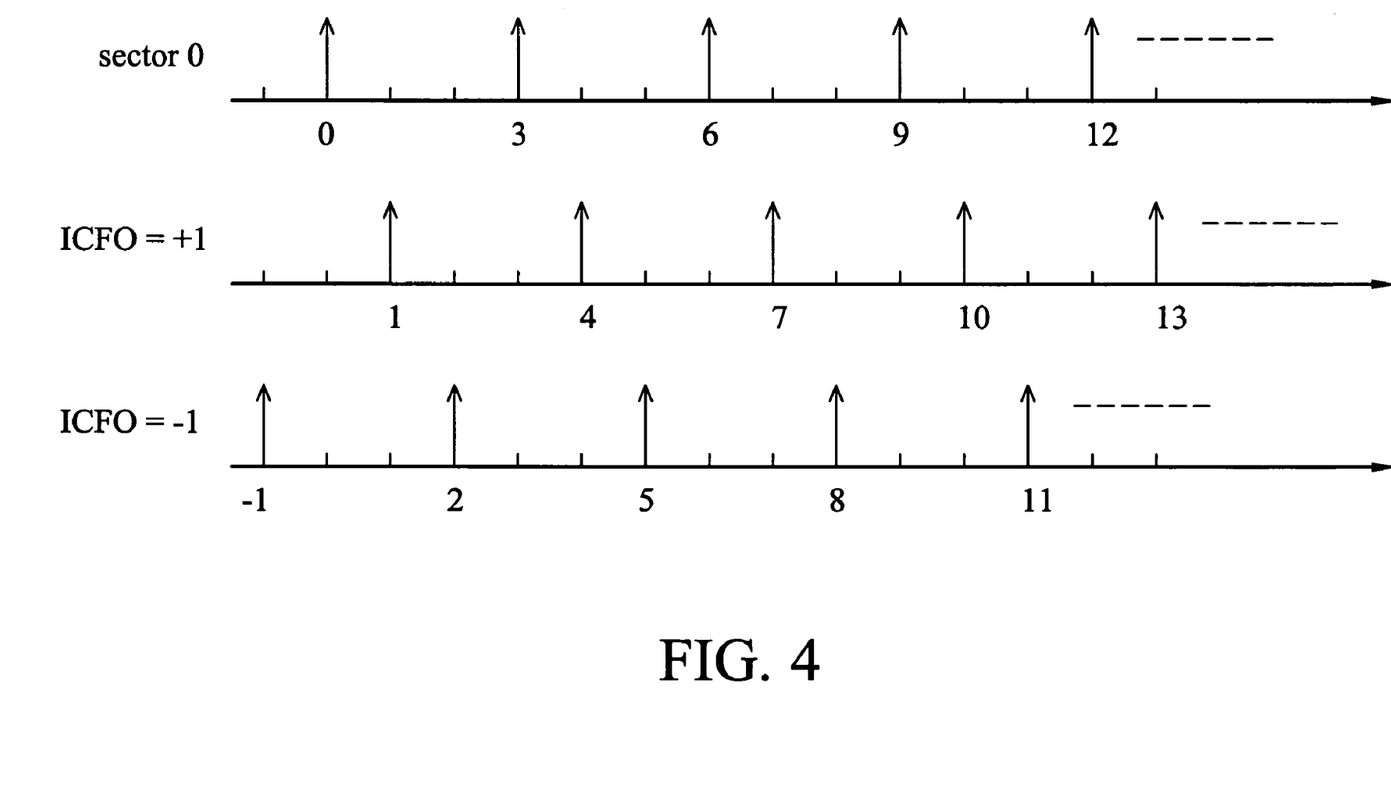
FIG. 4 illustrates shifted ideal subcarrier positions of sector 0.
Figure 5:
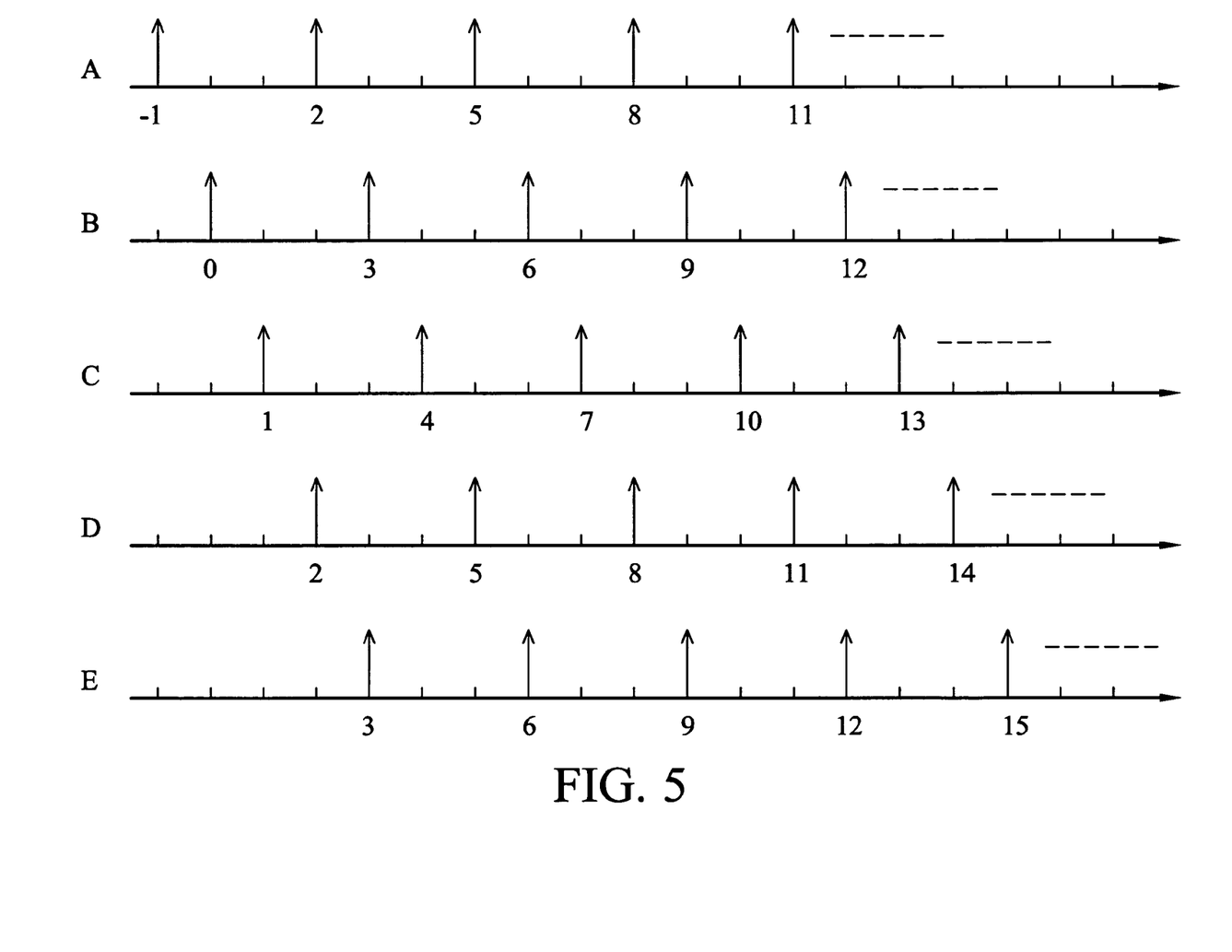
FIG. 5 illustrates subcarrier position hypotheses of a received preamble in a system having a maximum ICFO of 1.

The ideal subcarrier positions shown in FIG. 3 are limited to systems with zero ICFO. When there is integer carrier frequency offset between the transmitter and receiver, the frequency domain allocation of the received preamble is moved from the ideal subcarrier positions. In one embodiment of the invention, the subcarrier frequency spacing is about 11 kHz and the ratio of tolerable carrier frequency offset (tolerable CFO) about ±2 ppm. When the carrier frequency is about 3.5 GHz, the maximum CFO is about 14 kHz, about 1.25 times the subcarrier frequency; and when the carrier frequency is about 2.5 GHz, the maximum CFO is about 10 kHz, about 0.896 times the subcarrier frequency. Consequently, the maximum integral portion of CFO (ICFO) is ±1. In such a case, the ideal subcarrier positions shown in FIG. 3 are shifted to the right by one subcarrier spacing when the ICFO is +1, and to the left by one subcarrier spacing when the ICFO is −1. FIG. 4 illustrates shifted ideal subcarrier position of sector 0, wherein the maximum value of ICFO is 1. The upper drawing illustrates the ideal subcarrier position of sector 0, which starts from index 0. As shown in the middle drawing, the ideal subcarrier position is shifted to the right by one subcarrier spacing and starts from index +1 since the ICFO is +1. In the lower drawing, the ideal subcarrier position is shifted to the left by one subcarrier spacing and starts from index −1 since the ICFO is −1. In this case, there are three subcarrier position hypotheses for a received preamble belonging to sector 0, starting from indices −1, 0 and +1, respectively. Similarly, there are three subcarrier position hypotheses for a received preamble belonging to sector 1, staring from indices 0, +1 and +2, respectively. Similarly, there are three subcarrier position hypotheses for a received preamble belonging to sector 2, starting from indices +1, +2 and +3, respectively. Consequently, for a received preamble belonging to unknown sector, there are five subcarrier position hypotheses staring from indices −1, 0, +1, +2 and +3, respectively. FIG. 5 illustrates the subcarrier position hypotheses of a received preamble in a system having a maximum ICFO of 1. The drawings A, B, C, D and E show the five subcarrier position hypotheses.

In an embodiment of the invention, for determining the sector to which the received preamble belongs and the ICFO between the transmitter and receiver, the received preamble is retrieved according to all the subcarrier position hypotheses (such as A, B, C, D and E shown in FIG. 5 when the system is a WiMAX system and the maximum ICFO is 1) to generate a plurality of preamble pattern hypotheses. The correlation between the received pattern and a plurality of specified preamble patterns is ascertained by ascertaining the correlation between the preamble pattern hypotheses and a plurality of specified preamble patterns. Table 1 shows the specified preamble patterns for signals modulated by 2048-FFT (one spec of WiMAX). There are 114 specified preamble patterns numbered from 0 to 113, 38 belonging to sector 0, another 38 to sector 1, and the rest to sector 2. According to the correlation between the received pattern and the specified preamble patterns, the Cell ID indicating the cell in which the user is located and the Segment number indicating to which sector the received signal belongs are available.

ideal subcarrier position of sector 1, and the preamble pattern hypthesis B' is processed with the 38 specified preamble patterns belonging to sector 0 and the 38 specified preamble patterns belonging to sector 1 to ascertain the correlation therebetween. The subcarrier position hypothesis C may be the ideal subcarrier position of sector 1 or the shifted ideal subcarrier position of sector 0 or 2, and the preamble pattern hypothesis C' is processed with all specified preamble patterns (total 114) to ascertain the correlation therebetween. The subcarrier position hypothesis D may be the ideal subcarrier position of sector 2 or the shifted ideal subcarrier position of sector 1, and the preamble pattern hypothesis D' is processed with the 38 specified preamble patterns belonging to sector 2 and the 38 specified preamble patterns belonging to sector 1. The subcarrier position hypothesis E may only be the shifted ideal subcarrier position of sector 2, and the preamble pattern hypothesis E' need only be processed with the 38 specified preamble patterns belonging to sector 2.

Any method of ascertaining the correlation between the preamble pattern hypotheses (A', B', C', D' and E') and the specified preamble patterns (shown in TABLE 1) can be applied in the invention. After calculating the correlation between the preamble pattern hypotheses and the specified preamble patterns, a correct preamble pattern is ascertained, which is the specified preamble pattern having the highest correlation with all preamble pattern hypotheses (A', B', C', D' and E'). In Table 1, according to the correct preamble pattern, the Cell ID indicating the cell in which the user is located and the Segment number indicating to which sector the received preamble belongs are available. According to the sector to which the received preamble belongs, the ideal subcarrier position of the received signal is available and is named as a correct subcarrier position. Because there is an ICFO between the transmitter and receiver, the preamble pattern hypothesis corresponding to the correct subcarrier position may not be

TABLE 1

| Number | Cell ID | Segment | Specified preamble patterns for signals modulated by 2048-FFT |
|---|---|---|---|
| 0 | 0 | 0 | A6F294537B285E1844677D133E4D53CCB1F182DE00489E53E6B6E77065C7EE7D0ADBEAF |
| 1 | 1 | 0 | 668321CBBE7F462E6C2A07E8BBDA2C7F7946D5F69E35AC8ACF7D64AB4A33C467001F3B2 |
| 31 | 31 | 0 | A6D3D33AD9B56862DBF076E3ACE6A3150510CCC8BE77DE4E6E10EB5FE103765647D07DF |
| 32 | 0 | 1 | 52849D8F020EA6583032917F36E8B62DFD18AD4D77A7D2D8EC2D4F20CC0C75B7D4DF708 |
| . | . | . | ... |
| . | . | . | |
| . | . | . | |
| 64 | 0 | 2 | D27B00C70A8AA2C036ADD4E99D047A376B363FEDC287B8FD1A7794818C5873ECD0D3D56 |
| 95 | 31 | 2 | D7DFBC65797633A8C13D3EEC781D48952338136063B579D69437B28B744B5A4BE18AFA9 |
| 96 | 0 | 0 | ... |
| . | . | . | |
| . | . | . | |
| . | . | . | |
| 113 | 17 | 2 | 41E91307EC58801CFF2C7E9CFEFBEB71681FAE2BEAEC72D4E4556E99345D3BA4B369B59 |

In an embodiment of the invention, the system is a WiMAX system and the maximum ICFO is 1. After retrieving the received preamble according to the five subcarrier position hypotheses shown in FIGS. 5 (A, B, C, D and E), five preamble pattern hypotheses A', B', C', D' and E' (not shown) are available. Since the maximum amount of ICFO is 1, the subcarrier position hypothesis A may only be the shifted ideal subcarrier position of sector 0, and the preamble pattern hypothesis A' needs only be processed with the 38 specified preamble patterns belonging to sector 0 to ascertain the correlation therebetween. The subcarrier position hypothesis B may be the ideal subcarrier position of sector 0 or the shifted that with the highest correlation with the correct preamble pattern. The subcarrier position hypothesis corresponding to the preamble pattern hypothesis having the highest correlation with the correct preamble pattern is named as a verified subcarrier position hypothesis. The value of ICFO is estimated by calculating the offset between the correct subcarrier position and the verified subcarrier position hypothesis.

In one embodiment, the 31th specified preamble pattern is ascertained having the highest correlation with the preamble pattern hypotheses A', B', C', D' and E' and is recognized as the correct preamble pattern. In TABLE 1, the corresponding segment number is 0, indicating the received preamble belongs to sector 0. The ideal subcarrier position of sector 0 is recognized as the correct subcarrier position and is shown in the upper drawing of FIG. 6 (602). If the preamble pattern hypothesis A' is ascertained to have the highest correlation with the correct preamble pattern (the specified preamble pattern of number 31), the subcarrier position hypothesis A (corresponding to the preamble pattern hypothesis A') will be recognized as the verified subcarrier position hypothesis and is shown in the lower drawing of FIG. 6 (604). Comparing the correct subcarrier position 602 with the verified subcarrier position hypothesis 604, the verified subcarrier position hypothesis 604 leads the correct subcarrier position by one subcarrier spacing, indicating that the ICFO between the transmitter and receiver is −1.

In an embodiment of the invention, a sector number is assigned to represent the sector to which the received preamble belongs and a hypothesis number is assigned to represent the verified subcarrier position hypothesis. Based on the sector number and the hypothesis number, the ICFO between the transmitter and receiver can be estimated.

In one embodiment of the invention, when the received preamble belongs to sector 0, the sector number is assigned as 0. When the received preamble belongs to sector 1, the sector number is assigned as 1. When the received preamble belongs to sector 2, the sector number is assigned as 2. The hypothesis number is assigned as the index from which the verified subcarrier position hypothesis starts. For example, when the verified subcarrier position hypothesis is A as shown in FIG. 5, the hypothesis number is assigned as −1. Similarly, the hypothesis number is assigned as 0, 1, 2 or 3, respectively, when the verified subcarrier position hypothesis is B, C, D or E shown in FIG. 5. In such case, the offset between the correct subcarrier position and the verified subcarrier position hypothesis is calculated by subtracting the sector number from the hypothesis number.

Figure 6:
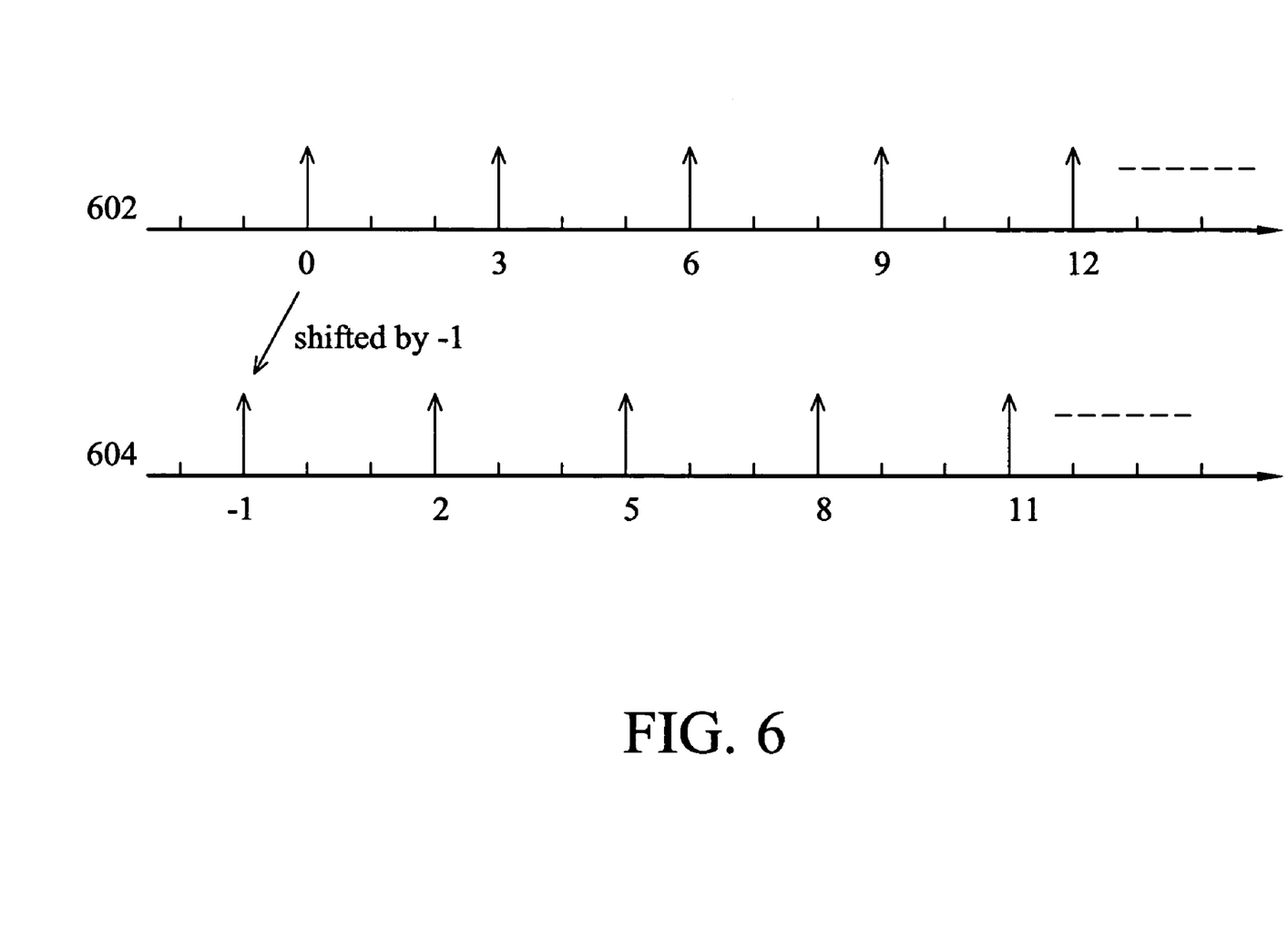
FIG. 6 illustrates an embodiment of the invention.

In the case shown in FIG. 6, the sector number is set as 0 since the received preamble belongs to sector 0, and the hypothesis number is set as −1 since the verified subcarrier position hypothesis starts from index −1. Subtracting the sector number from the hypothesis number, (−1)−0, the value of ICFO is calculated and is −1.

Figure 7:
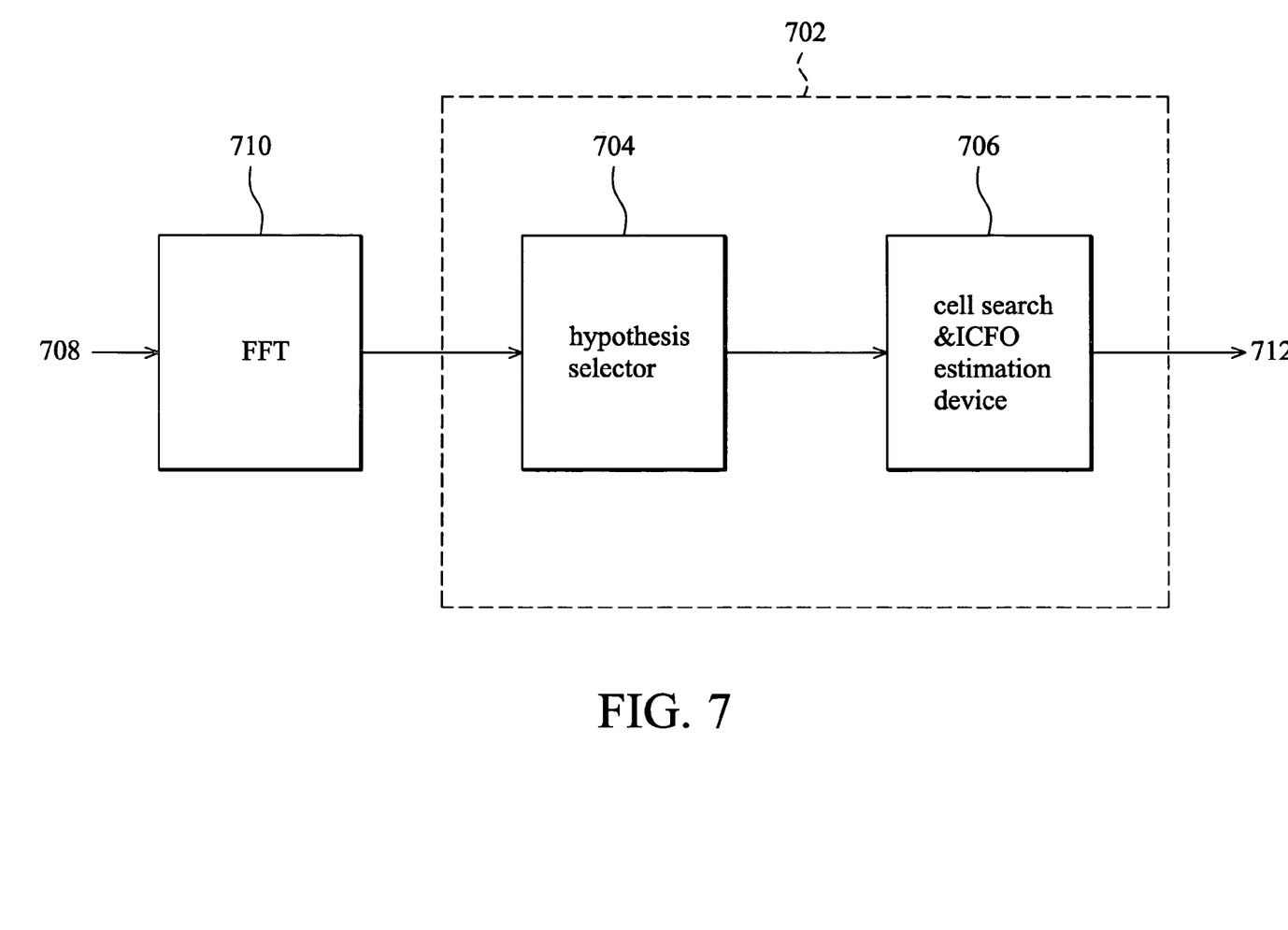
FIG. 7 shows an embodiment of the invention.

FIG. 7 shows an embodiment of the invention, in which an integer carrier frequency offset estimator 702 comprises a hypotheses selector 704 and a cell search and ICFO estimation device 706. A received preamble 708 is transmitted into a Fast Fourier Transform device 710 and transformed to frequency domain. The hypothesis selector 704 generates a plurality of preamble pattern hypotheses by retrieving the received preamble according to a plurality of subcarrier position hypotheses set by a plurality of idea subcarrier positions and the maximum amount of integer carrier frequency offset between a transmitter and a receiver. After receiving the preamble pattern hypotheses, the cell search and ICFO estimation device 706 calculates the correlation between the preamble pattern hypotheses and a plurality of specified preamble patterns, determines to which sector the received preamble belongs according to a correct preamble pattern that is the specified preamble pattern having the highest correlation with the preamble pattern hypotheses, obtains a correct subcarrier position according to the sector to which the received preamble belongs, and estimates the ICFO between the transmitter and receiver by calculating the offset between the correct subcarrier position and a verified subcarrier position hypothesis that is the subcarrier position hypothesis corresponding to the preamble pattern hypothesis having the highest correlation with the correct preamble pattern. The output signal 712 comprises the value of ICFO and the cell search result. The invention can estimate the value of ICFO from the preamble of one frame of the received signal.

In an embodiment of the invention, the cell search and ICFO estimation device 706 further assigns a sector number as 0, 1, or 2 when the received preamble respectively belongs to sector 0, 1, or 2, and assigns a hypothesis number as the subcarrier index from which the verified subcarrier position hypothesis starts. In such a case, the cell search and ICFO estimation device 706 further comprises a subtractor (not shown) for subtracting the sector number from the hypothesis number to calculate the offset between the correct subcarrier position and the verified subcarrier position hypothesis. The output of the subtractor is the value of ICFO.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded to the broadest interpretation so as to encompass all such modifications and similar arrangements.

What is claimed is:

1. A method of estimating integer carrier frequency offset between a transmitter and a receiver, comprising:
   setting a plurality of subcarrier position hypotheses for a received preamble according to a plurality of ideal subcarrier positions and the maximum amount of integer carrier frequency offset between the transmitter and the receiver;
   generating a plurality of preamble pattern hypotheses by retrieving the received preamble according to the subcarrier position hypotheses;
   calculating the correlation between the preamble pattern hypotheses and a plurality of specified preamble patterns;
   determining to which sector the received preamble belongs according to a correct preamble pattern that is the specified preamble pattern having the highest correlation with the preamble pattern hypotheses;
   determining a sector number to represent the sector to which the received preamble belongs;
   obtaining a correct subcarrier position according to the sector to which the received preamble belongs;
   determining a hypothesis number to represent a verified subcarrier position hypothesis that is the subcarrier position hypothesis corresponding to the preamble pattern hypothesis having the highest correlation with the correct preamble pattern; and
   estimating the integer carrier frequency offset between the transmitter and the receiver by calculating an offset between the correct subcarrier position and the verified subcarrier position hypothesis, wherein the offset between the correct subcarrier position and the verified subcarrier position hypothesis is calculated based on the difference between the sector number and the hypothesis number.

2. The method as claimed in claim 1, wherein only one frame is required to estimate the integer carrier frequency offset.

3. The method as claimed in claim 1 applied to estimate the integer carrier frequency offset between the transmitter and the receiver in an Orthogonal Frequency Division Multiple Access system.

4. The method as claimed in claim 1 applied to estimate the integer carrier frequency offset between the transmitter and the receiver in a WiMAX system.

5. The method as claimed in claim 3, wherein the sector number is determined to be 0, 1, or 2, respectively, when the received preamble belongs to a first, a second, or a third sector.

6. The method as claimed in claim 5 further comprising determining the hypothesis number as the subcarrier index from which the verified subcarrier position hypothesis starts.

7. The method as claimed in claim 6, wherein the offset between the correct subcarrier position and the verified subcarrier position hypothesis is calculated by subtracting the sector number from the hypothesis number.

8. The method as claimed in claim 1, wherein the number of specified preamble patterns that are taken into account in calculating the correlation between one of the preamble pattern hypotheses and the specified preamble patterns is dependent on the subcarrier position hypothesis of the preamble pattern hypothesis.

9. The method as claimed in claim 1, wherein the total number of the preamble pattern hypotheses is five.

10. An integer carrier frequency offset estimator, comprising:
a hypotheses selector, generating a plurality of preamble pattern hypotheses by retrieving a received preamble according to different subcarrier position hypotheses set by a plurality of ideal subcarrier positions and the maximum amount of integer carrier frequency offset between a transmitter and a receiver; and
a cell search and ICFO estimation device, calculating the correlation between the preamble pattern hypotheses and a plurality of specified preamble patterns, determining to which sector the received preamble belongs according to a correct preamble pattern that is the specified preamble pattern having the highest correlation with the preamble pattern hypotheses, determining a sector number to represent the sector to which the received preamble belongs, obtaining a correct subcarrier position according to the sector to which the received preamble belongs, determining a hypothesis number representing a verified subcarrier position hypothesis that is the subcarrier position hypothesis corresponding to the preamble pattern hypothesis having the highest correlation with the correct preamble pattern, and estimating the integer carrier frequency offset between the transmitter and the receiver by calculating an offset between the correct subcarrier position and the verified subcarrier position hypothesis, wherein the offset between the correct subcarrier position and the verified subcarrier position hypothesis is calculated based on the difference between the sector number and the hypothesis number.

11. The integer carrier frequency offset estimator as claimed in claim 10, wherein only one frame is required to estimate the integer carrier frequency offset.

12. The integer carrier frequency offset estimator as claimed in claim 10 implemented in an Orthogonal Frequency Division Multiple Access system.

13. The integer carrier frequency offset estimator as claimed in claim 10 implemented in WiMAX system.

14. The integer carrier frequency offset estimator as claimed in claim 12, wherein there are three sectors in each cell of the OFDMA system, and the cell search and ICFO estimation device determining the sector number to be 0, 1, or 2, respectively, when the received preamble belongs to a first, a second, or a third sector.

15. The integer carrier frequency offset estimator as claimed in claim 14, wherein the cell search and ICFO estimation device determines the hypothesis number as the subcarrier index from which the verified subcarrier position hypothesis starts.

16. The integer carrier frequency offset estimator as claimed in claim 15, wherein the cell search and ICFO estimation device further comprises a subtractor calculating the offset between the correct subcarrier position and the verified subcarrier position hypothesis by subtracting the sector number from the hypothesis number.

17. The integer carrier frequency offset estimator as claimed in claim 10, wherein the number of specified preamble patterns that are taken into account in calculating the correlation between one of the preamble pattern hypotheses and the specified preamble patterns is dependent on the subcarrier position hypothesis of the preamble pattern hypothesis.

18. The integer carrier frequency offset estimator as claimed in claim 10, wherein the total number of the preamble pattern hypotheses is five.

* * * * *

UNITED STATES PATENT AND TRADEMARK OFFICE
CERTIFICATE OF CORRECTION

| | | |
|---|---|---|
| PATENT NO. | : 7,894,539 B2 | Page 1 of 1 |
| APPLICATION NO. | : 11/808207 | |
| DATED | : February 22, 2011 | |
| INVENTOR(S) | : Huei-Jin Lin et al. | |

It is certified that error appears in the above-identified patent and that said Letters Patent is hereby corrected as shown below:

ON THE TITLE PAGE:

Please insert the following:

-- Related U.S. Application Data

(60) Provisional application No. 60/832,621, filed on July 24, 2006. --

Signed and Sealed this

Nineteenth Day of July, 2011

David J. Kappos
*Director of the United States Patent and Trademark Office*